July 28, 1931. J. J. TATE 1,816,062
GRAIN DRILL
Filed Jan. 27, 1930 2 Sheets-Sheet 1
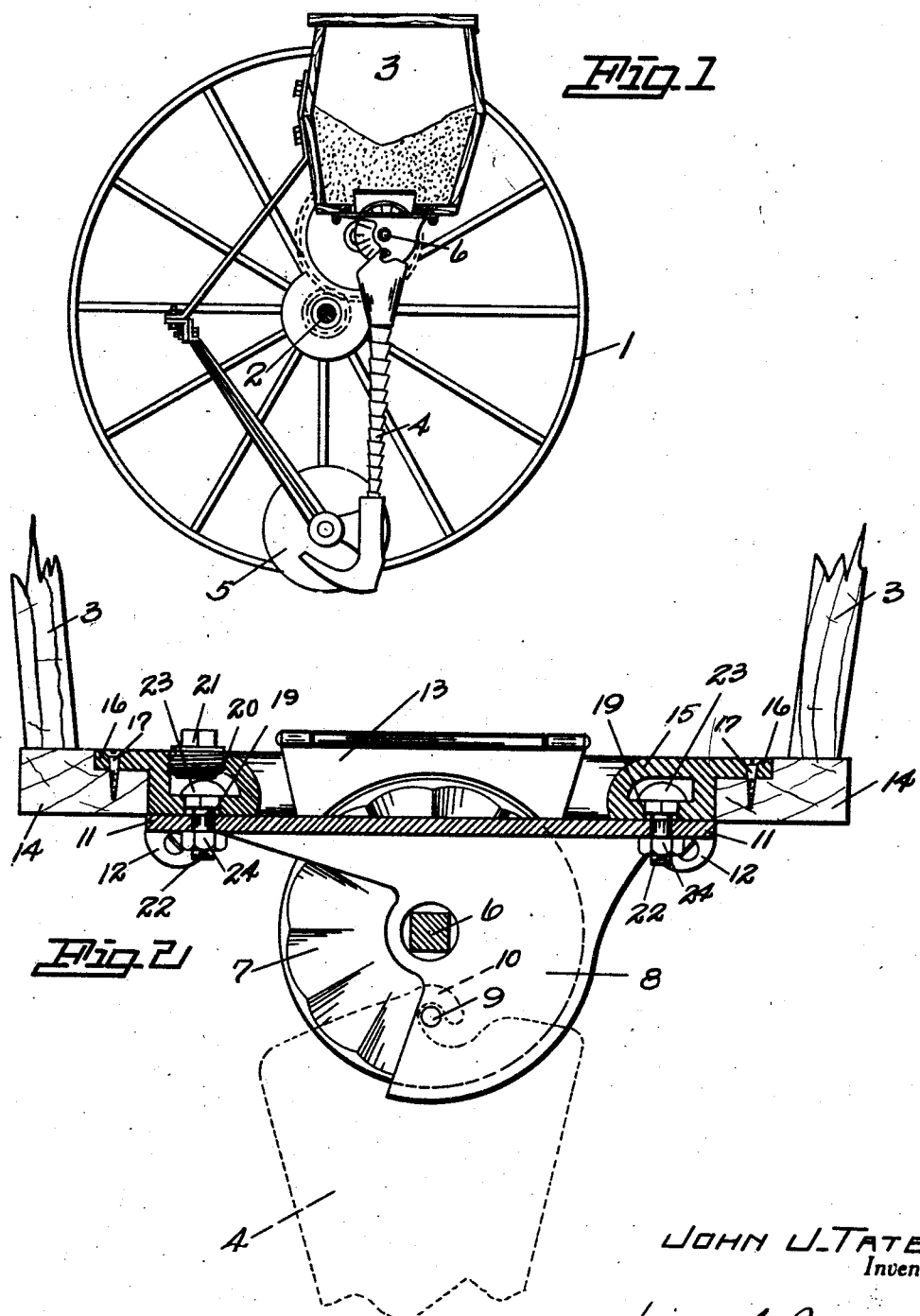

July 28, 1931.  J. J. TATE  1,816,062
GRAIN DRILL
Filed Jan. 27, 1930    2 Sheets-Sheet 2

JOHN J. TATE
Inventor

By Herbert E. Smith
Attorney

Patented July 28, 1931

1,816,062

UNITED STATES PATENT OFFICE

JOHN J. TATE, OF ALBION, WASHINGTON

GRAIN DRILL

Application filed January 27, 1930. Serial No. 423,635.

My present invention relates to an improved grain drill for sowing seed, or planting seed grain, and the invention applies particularly to the feed mechanism for depositing the seed grain in the seed tube. As is well known to those familiar with seed planting machines, in seeding with horse drawn vehicles the driver, who usually follows the implement at the rear, is enabled to observe the action of the feeding devices, and therefore is in position to correct any defective operation of the several drilling devices.

In modern farm equipment, where a tractor or power machine is employed to draw the drilling or seeding machine across the field, the tractor is utilized in front of the implement, and the driver consequently is located in front of the seeding machine for control of the tractor. With the seeding machines now in use, if a tractor is employed to draw the implement, the driver cannot observe the feeding actions of the several feed devices. The primary object of my invention is to provide the seeding implement with means whereby the feeding devices may selectively be changed to insure a sight-feed either from the front of the implement, or from the rear of the implement, depending upon whether horses are hitched to the implement or a tractor is employed to draw the implement. Thus, in carrying out my invention, the planter or seeding machine is equipped with changeable devices forming parts of the feed devices or feed mechanism, and the changes necessary for converting the implement to either a horse-drawn planter, or to a power-propelled implement, may be made with facility and convenience.

In the manufacture of well known and standard types of seed planters, I provide a special support in the bottom of each grain box, for the feed cup and feed wheel and accessories, whereby the position of the feed wheel and feed cup may readily be changed; and means are also provided whereby the driving movement, or movement imparted from the feed shaft to the feed wheel may be reversed, thus insuring either a rear-sight feed or a front-sight feed of the seed grain.

The invention consists in certain novel combinations and arrangements of parts as will hereinafter be more fully set forth and claimed. In the accompanying drawings I have illustrated one complete example of the physical embodiment of my invention wherein the parts are combined and arranged according to one mode I have thus far devised for the practical application of the principles of my invention.

Figure 1 is a detail vertical sectional view, longitudinally of the machine, omitting the traction wheel, and showing one of the grain drills adapted for a front-sight feed, it being understood that the machine travels to the left in this figure of the drawings.

Figure 2 is an enlarged vertical sectional view through the bottom of the grain box in Figure 1, showing the changeable feed device.

Figure 3:
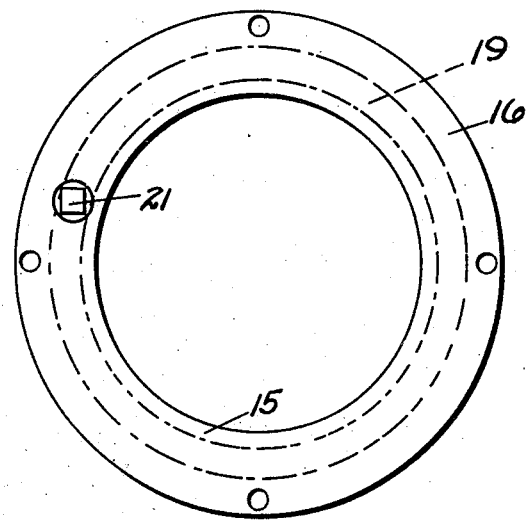
Figure 3 is a top plan view of the ring located in the bottom of each of the grain boxes, for supporting the reversible feed cup and feed wheel.

In order that the general arrangement and utility of parts may readily be understood I have shown as much as is necessary of a planter, including the traction wheel 1 and main axle 2 for providing the power to operate the grain drills. The grain is carried in the usual grain box 3, and is fed therefrom to the feed tube 4, which deposits the grain at the rear of the furrow opener, here shown as a rotary disk 5, and the deposited grain is covered by the soil in usual manner.

The usual feed shaft 6 (here shown as square in cross section) extends transversely of the machine, below the row of grain boxes, and below each box a reversible or changeable feed wheel 7 is carried on the shaft and provided with the usual radial serrations. The feed wheel is partially enclosed within the sectional feed cup 8, and the feed tube 4 is suspended from the cup on a pair of exterior pins 9 projecting laterally from the cup, by hooks 10 at the head or top of the tube.

The sectional feed cup is provided with top plates 11 that are flanged as at 12 and secured together by bolts or screws in usual manner. The plates form a slot for the feed wheel at the top of the cup, and above the wheel the usual adjustable feed gates 13 are provided to regulate the feed of grain from the box to the wheel and through the cup to the tube.

The transversely extending board 14 which forms the bottom for the seed box, is fashioned with a row of countersunk seats or openings, one below each box, and in this countersunk seat a hollow ring 15 is seated. The rings each have an annular attaching flange 16, and screws 17 are passed through holes in the flange to secure the ring in the countersunk seat. The flat bottom 18 of the ring is fashioned with an annular slot 19, and in the top wall of the ring an opening 20 is provided, which is threaded to receive the screw plug 21, the plug being employed to normaly close the opening.

The ring 15 is employed to support the feed wheel and the feed cup, as well as the feed shaft 6, and the top plates 11 of the cup are attached to the ring by means of bolts 22 that pass through bolt holes in the top plates. As seen in Figure 2 the heads 23 of the bolts are located within the hollow ring and the bolts pass up through the slot 19 of the ring. By means of the heads on the bolts, and nuts 24 on the lower ends of the bolts, the top plates are clamped to the supporting ring.

From this description it will be apparent that with the shaft 6 withdrawn from the cups and wheels of the grain drills, and with the nuts 24 loosened, the wheels and the cups may be turned through an arc of 180 degrees, to bring the open portion or cut away portion of the cup, either toward the front or the rear of the implement, for observation of the feeding action of the grain. In turning the cups, the gates 13 and the top plates 11 also turn, and the heads 23 of the bolts slide around within the hollow head, while the bolts themselves slide through the annular slot or slots of the flat bottom of the ring.

After the cups and wheels have been turned as desired, the nuts 24 are tightened, and the shaft 6 is replaced, it being understood that the hooks of the feed tube 4 are interchangeable on their pins 9.

Figure 4:
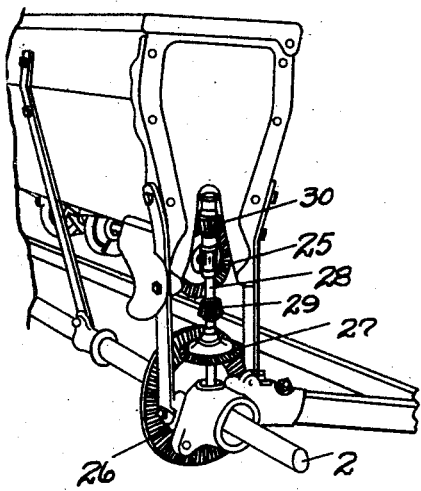
Figure 4 is a perspective view at one end of the transversely extending grain boxes, with the traction or drive wheel omitted, showing the driving mechanism in position for a rear-sight feed.
Figure 5:
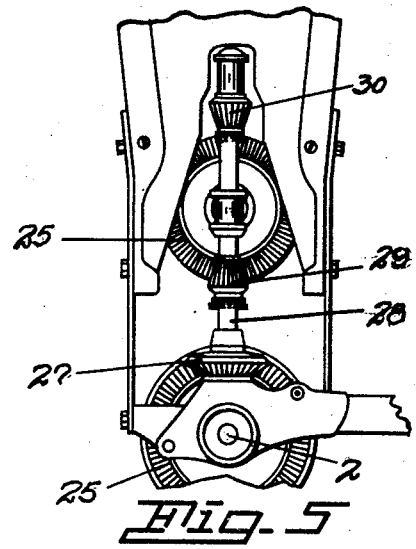
Figure 5 is an end view of the driving mechanism in position for a front-sight feed.

In Figures 4 and 5 the driving mechanism, or the transmission mechanism, between the main shaft and the feed shaft, is shown as comprising a driven bevel gear 25 on the seed or feed shaft and a driving gear 26 on the shaft 2 of the implement. A bevel pinion 27 on the vertically arranged shaft 28 receives power from the gear 26, and the shaft 28 that is journaled in suitable bearings, is provided with a pair of slide gears 29 and 30 that are selectively adapted for engagement with the bevel gear 25. The pinions 29 and 30 are for alternate use with the gear 25, depending on the position of the feed wheel and the feed cup. In Figure 4 the upper pinion 30 is in mesh with the gear 25 for the rear-sight feed, while in Figure 5 the pinion 29 is in mesh with the driven gear 25 for a reversal of movement, when the front-sight feed is employed.

The device of my invention is capable of installation as part of the equipment of grain drills of this type now in use, or the special construction of the changeable feed device may be embodied in the implement during the process of manufacture. The slight changes, due to the addition of the pinion 30, in the driving mechanism, to provide for the reversal of parts, may also be made in existing implements, or the special construction of driving mechanism or transmission mechanism may be embodied during the manufacture of the implement.

Having thus fully described my invention, what I claim as new and desire to secure by Letters Patent is:—

1. In a grain drill, the combination with a grain box having a slotted, open ring in its bottom portion, of a reversible feed cup, bolts and nuts for clamping the cup to said slotted ring, a seed wheel in the cup and a feed shaft passing through the cup and wheel as described.

2. The combination with a grain box having a countersunk opening in its bottom and a flanged, hollow, open ring secured in said opening, of a feed cup having a top plate below the ring and a feed wheel in the cup, the bottom plate of the hollow ring being provided with an annular slot, a plurality of bolts passing through the slot and having heads in the hollow ring, said bolts passing through holes in the top plate, and clamp nuts on the lower ends of the bolts.

3. The combination with a row of grain boxes having bottom supporting devices, of a row of reversible feed cups and feed wheels, releasable means for supporting the cups from said devices, a single, removable, feed shaft passing through the cups and changeable driving mechanism for operating said shaft in reversed directions.

4. The combination with a grain box and a supporting device in the bottom thereof having an annular bolt-slot, of a reversible feed cup having a partially open side, an attaching plate at the top of the cup, bolts joining said plate and supporting device and nuts on the bolts for securing the cup in adjusted position.

In testimony whereof I affix my signature.

JOHN J. TATE.